FLUID METERS

Original Filed Nov. 7, 1962 2 Sheets-Sheet 1

INVENTORS
Winston F. Z. Lee
Harry W. Fisher
Richard L. Crumley
Strauch, Nolan & Neale
ATTORNEYS INVENTORS
Winston F. Z. Lee
Harry W. Fisher
Richard L. Crumley
BY Strauch, Nolan & Neale
ATTORNEYS United States Patent Office Re. 26,654
Reissued Aug. 26, 1969

26,654
FLUID METERS

Winston F. Z. Lee, Vernona, Harry W. Fisher, Pittsburgh, and Richard L. Crumley, Southampton, Pa., assignors to Rockwell Manufacturing Company, Pittsburgh, Pa., a corporation of Pennsylvania Original No. 3,256,736, dated June 21, 1966, Ser. No. 236,019, Nov. 7, 1962. Application for reissue Jan. 24, 1968, Ser. No. 706,198
Int. Cl. G01f *1/00*
U.S. Cl. 73—229 19 Claims

Matter enclosed in heavy brackets [ ] appears in the original patent but forms no part of this reissue specification; matter printed in italics indicates the additions made by reissue.

*ABSTRACT OF THE DISCLOSURE*

*A fluid flow meter having a fluid driven metering rotor rotatably supported by bearing members which engage a bearing surface that is formed rigid with a wall of non-magnetic material. The well projects into a rotor-receiving metering chamber along an axis that is substantially normal to flow of fluid through the chamber. A drive magnet carried by the rotor is magnetically coupled to a shaft-mounted driven magnet within the well to transmit rotation of the rotor for actuating a register or the like.*

This invention relates to fluid meters and particularly to improve meter structures wherein a rotor disposed in the flow path is specially mounted and associated with a register drive.

In its preferred embodiment the meter of the invention will be disclosed as particularly adapted for high pressure fluid lines, as for metering water and other liquids at pressure up to 5,000 pounds per square inch and above for flooding oil wells to displace oil deposits.

Since these meters handle rather abrasive and sometimes corrosive liquids at such high pressures and are usually installed and serviced by relatively unskilled labor in the field, they must be sturdy, internally protected against corrosion and abrasion, easy to assemble and disassemble and capable of simple repair or replacement of parts. The structure of the meter of the invention improves over known meters in this respect as will appear.

It is therefore the major object of this invention to provide a novel meter structure which is capable of handling liquids at high flow rates and high pressures, which has optimum sealing and other protection against erosion and corrosion by line fluid, and which is relatively easy to assemble and dismantle.

Another object of the invention is to provide a novel liquid meter structure wherein a rotor driven by fluid flow is specially mounted in a rotor chamber.

A further object of the invention is to provide a novel liquid meter structure wherein a rotor driven by fluid flow is mounted directly on a register assembly.

A further object of the invention is to provide a novel meter structure wherein a register and drive assembly rotatably mounts a rotor disposed in the path of fluid flow and a magnetic drive is provided to the register.

Another object of the invention is to provide a novel meter structure wherein a sealed register assembly has its drive shaft carrying a magnetic drive element enclosed within a stationary tube that projects into the flow path and rotatably supports a rotor carrying a coacting magnetic drive element.

A further object of the invention is to provide a novel meter structure having a special arrangement of rotor chamber and inlet and outlet passages.

A further object of the invention is to provide a novel meter having an accurately dimensioned liquid inlet passage that is hard surfaced.

Another object of the invention is to provide a novel meter structure wherein a rotor driven by fluid flow is rotatably mounted on a post which projects from the register assembly and is threaded into the meter body, and a special seal arrangement is provided to protect the threads against attack by line fluid.

It is a further object of the invention to provide a meter structure having the register mechanism and drive sealed in a casing and a novel magnetic drive responsive to fluid flow and carried by the casing.

A further object of the invention is to provide a liquid meter having a metering chamber in which is disposed a rotor driven by fluid flow and special stationary coacting vane structure in the chamber for controlling turbulence during the passage of liquid through the chamber.

It is another object of the invention to provide a novel meter having a body containing a rotor chamber closed by a removable top member that supports the rotor and register assembly whereby removal of the top member removes the rotor and opens the chamber for cleaning and repair.

Further objects of the invention will presently appear as the description proceeds in connection with the appended claims and the annexed drawings wherein:

Figure 1:
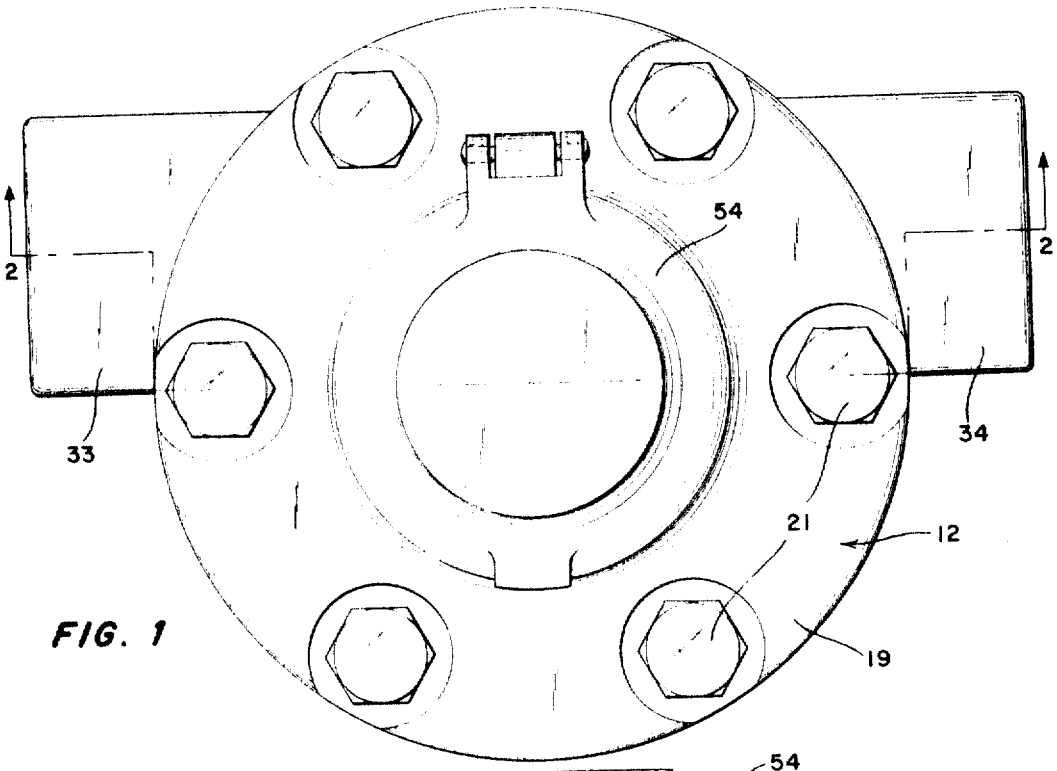
FIGURE 1 is a top plan view of a meter assembly according to a preferred embodiment of the invention.

The illustrated meter assembly comprises a lower housing part 11 and an upper housing part 12. The lower housing part is essentially cup-shaped with an integral bottom wall 13, and the upper housing part serves as a closure extending over the top of the rotor chamber 14. Lower housing part 11 has an internal cylindrical wall surface 15 surrounding chamber 14 and pivoting a cylindrical extension 16 on the upper housing part in the assembly.

Lower housing part 11 is formed around the upper edge of chamber 14 with a flat smooth annular face 17 on which seats the coextensive corresponding flat annular face 18 of an outer flange 19 of the upper housing part. A plurality of bolts 21 extend through flange 19 into threaded bores 22 in the lower housing part to tightly secure the housing parts 11 and 12 together.

At the upper edge of wall 15 lower housing lower part 11 is formed with an undercut shoulder at 23 to seat a resilient O-ring seal 24 that is compressed axially of wall 15 but unconfined radially of wall 15. Thus when bolts 21 are drawn tight the housing parts 11 and 12 which are quite thick-walled and sturdy to resist deformation due to high internal fluid pressures are drawn into fluid tight assembly. If desired an annular compressible gasket 25 may be provided between faces 17 and 18.

It will be observed that high internal pressures in chamber 14 serve only to increase the sealing action of ring 24 at the inner edge of the very small space between housing surfaces 17 and 18.

Lower housing part 11 is formed with an inlet passage 26 and an axially aligned outlet passage 27. Passage 26 flares outwardly to a threaded bore 28 for receiving a pipe at one side of the meter, and passage 27 flares outwardly to a threaded bore 29 for receiving a pipe at the other side of the meter.

It will be observed that inlet passage 26 is of smaller diameter than outlet passage 27, and preferably inlet passage is coated at 31 with a very hard smooth material, such as an abrasion resistant chrome or like plating, to provide an inlet of accurately fixed size that will resist any change in diameter due to wear by erosion or corrosion of the incoming fluid. After reducing to the desired diameter, inlet passage 26 has a uniform diameter channel as at 31 of a length sufficient to avoid vena contracta effect.

It has been found that by accurately machining to a predetermined size and hard-surfacing the inlet passage at 31 the accuracy of the meter can be maintained for very long periods without recalibration or replacement of parts.

Figure 3:
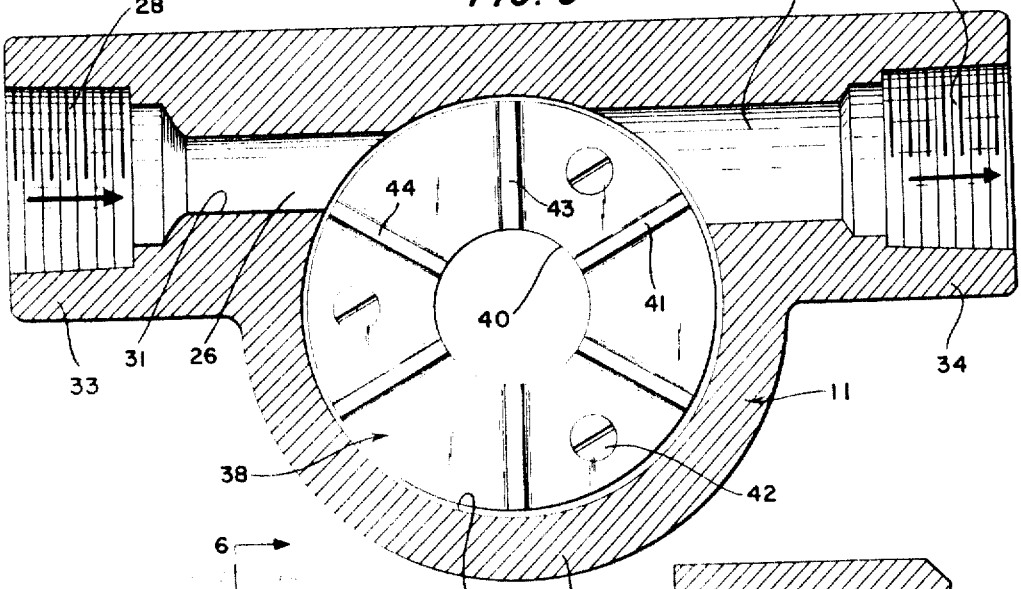
FIGURE 3 is a section substantially on line 3—3 of FIGURE 2 showing the stationary vane plate which coacts with the rotor for turbulence control.

Referring to FIGURE 3, it will be noted that lower housing part 11 is not symmetrically annular but that the coaxial inlet and outlet passages 26 and 27 intersect chamber 14 generally tangentially just within its outer periphery. Actually housing part 11 comprises a part cylindrical wall 32 that merges at either side with oppositely extending bosses 33 and 34 containing the inlet and outlet fluid passages. The axes of chamber 14 and passages 26, 27 are perpendicular to each other.

Figure 2:
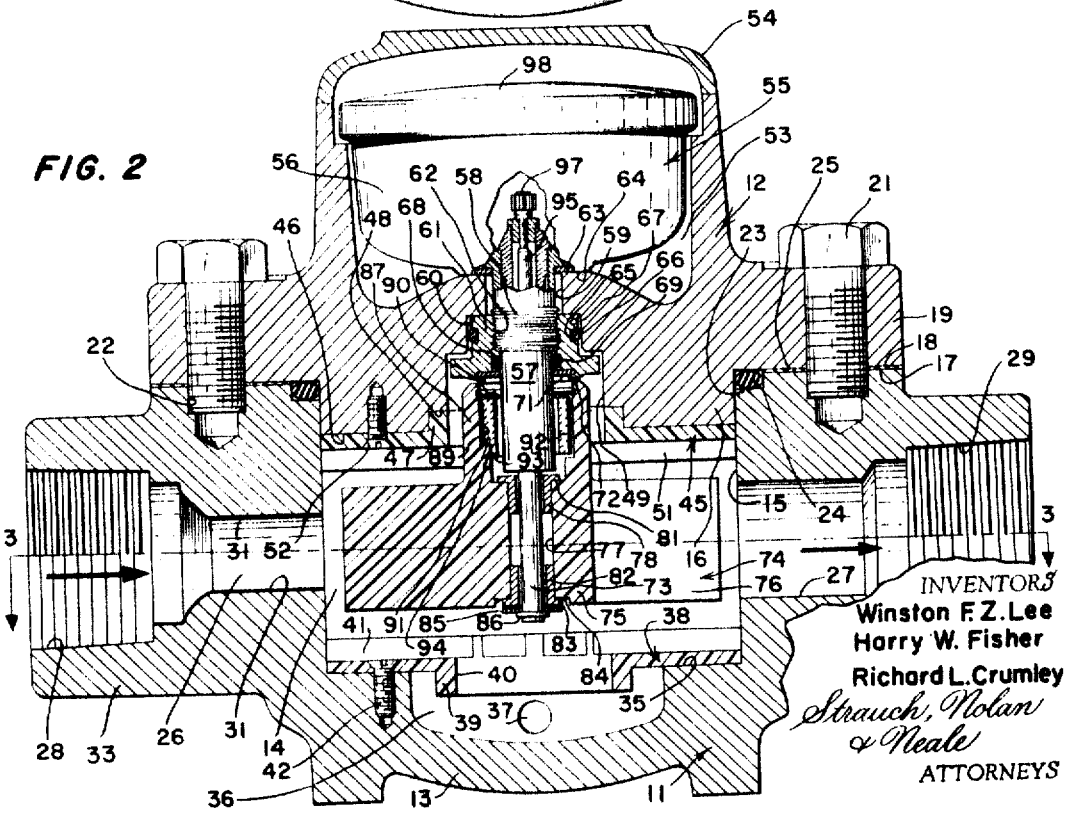
FIGURE 2 is a section substantially on line 2—2 of FIGURE 1 showing the internal structure of the meter particularly the novel magnetic drive transmission.

As shown in FIGURE 2, axially aligned passages 26 and 27 intersect chamber 14 approximately midway between top and bottom.

At its lower edge wall surface 15 intersects at right angles a flat annular surface 35 surrounding a depression 36 that has a drain plug opening 37 in the wall of housing part 11. Surface 35 supports a vane plate 38 that is relatively thin and annular, being provided with a downwardly extending hollow cylindrical boss 39 surrounding central opening 40.

Plate 38, as shown in FIGURE 3 has a plurality (here six) of upstanding integral radial vanes 41 that extend from opening 40 to the outer periphery, and is secured rigidly to housing part 11 as by a plurality of screws 42 located between the vanes 41.

Vanes 41 are equally angularly spaced and they are of rectangular cross section being of equal height and width and relatively shallow, and in no case extending above the level of the outlet passage 27. As shown in FIGURE 3 preferably one vane, designated at 43 extends at right angles to the common axis of the fluid passages 26, 27 and the vane 44 next upstream therefrom terminates in such location that its outer edge does not lie in the direct path of liquid entering by inlet passage 26.

At the top of chamber 14, an identical annular vane plate 45 is seated on a flat annular surface 46 on the bottom of extension 16, with the central cylindrical boss 47 being piloted within a cylindrical undercut shoulder 48 formed at the lower end of a central bore 49 in upper housing part 12. Plate 45 has the same number of vanes 51 as plate 38, and vanes 51 are equally angularly spaced and of the same shape and size as lower vanes 41. Plate 45 is rigidly secured to upper housing part 12 as by screws 52.

Vane plates 38 and 45, being identical, are interchangeable. They are preferably integral molded parts made of a suitable hard tough, dimensionally stable wear and water resistant plastic such as the plastic known as Delrin. Delrin is an acetal resin which is thermoplastic and the plates molded from it exhibit high strength and stiffness combined with adequate resiliency, toughness and resistance to distortion over a very wide temperature range, and it is particularly of good dimensional stability in the presence of moisture. Vane plates of this material are resistant to oil and organic solvents and have excellent abrasion resistance. Alternatively the plates may be made of long chain linear polypropylene for example.

It has been found that the clearance between the fixed vanes and the rotor 75 is not critical. In tests where the clearances were varied considerably, the meter accuracy was not affected significantly. In the sediment-laden, impure liquid service for which this meter is designed, this added clearance was a great benefit. These fixed vanes generated turbulence at the higher flow rates, which correspondingly increases the range of accuracy of the meter.

Referring to FIGURE 2, the upper housing part 12 has a central cup-shaped recess 53 closed at the top by hinged cover 54.

A unitary register and drive assembly 55 has its enlarged register casing portion 56 disposed in recess 53, and rigid with casing 56 is a rigid drive enclosing tube 57 that has a threaded section 58 extending through the upper reduced portion 59 of bore 49.

A register nut 61 has a threaded bore 62 by which it is rotatably mounted on the threaded portion of tube 57. As nut 61 is rotated, it reacts against shoulder 60 in the bore 67 and draws down on tube 57 to seat the flat lower end 63 of the register casing tight on the annular face 64 that surrounds the upper end of the bore.

Figure 4:
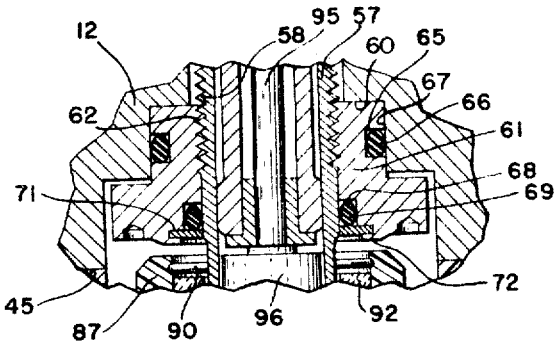
FIGURE 4 is an enlarged fragmentary section showing the sealing fastener for the register assembly attachment to the meter cover.

Nut 61 (FIGURE 4) is provided with an external annular groove 65 containing a radially compressed resilient O-ring seal 66 coacting with the bore wall 67. At its lower end nut 61 has an internal shoulder 68 for seating a resilient radially compressed O-ring seal 69 that coacts with the smooth surface of tube 57. A washer 71 held in place by a lip 72 spun over from the edge of the nut bore retains the O-ring from below.

Thus when the nut 61 is drawn tight to rigidly secure the register assembly in place, the outer and inner O-ring seals 66 and 69 are compressed radially between the nut, stem 57 and the bore to prevent fluid pressure leakage from chamber 14 to the threads at 58, 62 thereby protecting them against corrosion. This is very important in a high pressure meter because if the threads 58, 62 should collapse or strip due to the combined effects of corrosion and pressure from chamber 14 the register assembly would be blown out of the line.

At the lower end of register assembly 55 the tube 57 reduces in diameter to a relatively solid post 73 disposed on a vertical axis and projecting into chamber 14, and the meter rotor assembly 74 is mounted rotatably on post 73.

Rotor [asembly] *assembly* 74 comprises a bladed rotor 75 having a plurality of equally spaced radial vanes 76 of the same size. Rotor 75 has a central bore 77 containing an upper radial bushing 78 having a flange seated on the bore shoulder 81 and a lower radial bushing 82 formed with a flange 83 seated into lower bore shoulder 84. Bushings 78 and 82 are preferably self lubricating and molded from a graphitic composition, and they are identical and interchangeable.

The entire rotor assembly 74 is supported from below on shaft 73 by one or more thrust washers 85 held axially by a suitable fastener 86.

It will be noted in FIGURE 2 that the rotor 75 is supported in chamber 14 vertically midway between the vane plates at the upper and lower chamber ends and in symmetrical relation to the plane containing the common axis of passages 26 and 27.

The rotor 75 is unitarily molded from a suitable plastic, such as acetyl resin, polypropylene or the like. The same material as that used for the vane plates 38 and 45 is acceptable.

Figure 5:
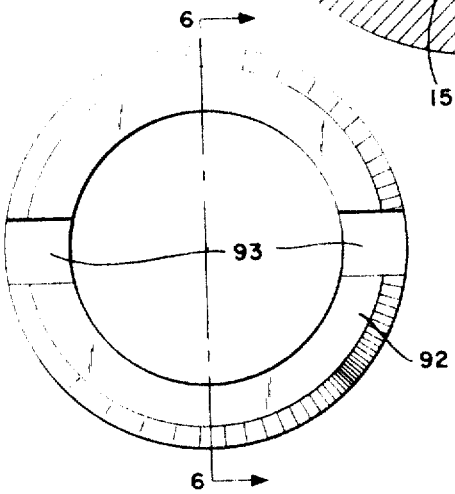
FIGURE 5 is an end elevation of the annular magnet of the drive.
Figure 6:
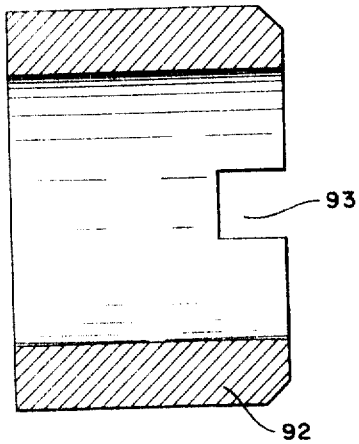
FIGURE 6 is a section on line 6—6 of FIGURE 5.

The hub of rotor 75 has an upwardly projecting boss 87, and within boss 87 the rotor bore is successively enlarged at 89 and formed with annular shoulder 91. Mounted within the cylindrical bore section 89 is an annular ceramic magnet 92 which freely surrounds the hollow lower portion of tube 57. As shown in FIGURES 5 and 6 magnet 92 is formed at its lower end with diametrically opposed notches 93, of rectangular shape adapted to interfit with projections 94 of the same shape upstanding from shoulder 91 to insure rotation of the magnet 92 with the rotor. A snap ring 90 axially restrains the magnet.

Figure 7:
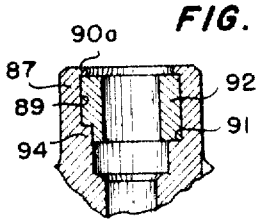
FIGURE 7 is a section similar to FIGURE 4 showing an alternate retainer for the drive magnet.

An alternate means for axially retaining the driver magnet 92 in rotor boss 87 is shown on FIGURE 7. Being molded [form] *from* a plastic material, such as the above mentioned Delrin, the rotor has a limited amount of elasticity. The alternate configuration replaces the snap ring 90 (and its associated groove) with internally projecting lip 90a. The opening in 90a is made smaller than the outside diameter of drive magnet 92. This flexible lip allows insertion of magnet 92 and then holds it in place with notches 93 interfitting projections 94 molded in the shoulder 91.

The register assembly 55 contains an input shaft 95 suspended in suitable bushings and having fixed to its lower end a driven magnet 96 (FIGURE 4) disposed within the lower end of the hollow space within tube 57 so as to be surrounded by the driving magnet 92 fixed to the rotor 74. At the upper end of shaft 95 is a gear 97 that drives the register indicator visible through window 98 when cover 54 is raised.

Preferably the entire register assembly is a sealed unit whereby the mechanism therein is protected against moisture, dirt and tampering. It is inserted into assembly in the invention merely by thrusting tube 57 through the meter body bore 59 and tightening nut 61. This assembly may for example be the unit disclosed in United States Letters Patent No. 2,857,763, issued Oct. 28, 1958, to which attention is directed for further details, with variations of magnetic drive coupling. The O-rings 66 and 69 prevent the line fluid from reaching the loaded threads at 58 and on the nut 61.

The rotor assembly 74 is mounted on post 73 after the register assembly 55 is fixed in place and before the housing parts are secured together, and washers 85 may be employed in sufficient number to set the rotor 75 at the proper height in chamber 14. Then the parts are all assembled in proper operative relation merely by attaching the housing members together with bolts 21.

In operation, the water, which for example may be pumped out of a nearby stream into the pipeline, enters passage 26, impinges on the rotor within the chamber 14 and leaves through passage 27. Since this water may contain abrasive particles, the special wear resistance of the inlet at 31 is very important. The hard surfacing at 31 resists erosion and change of the inlet passage dimension so that only infrequent calibration is needed.

The stationary vane plates 38 and 45 generate turbulence which acts to reduce the peak value of the registration curve. This curve, which shows percent of flow registered vs. flow rates in gallons per minute is the usual means of determining the accuracy of a water meter, and must be within certain limits at specified rates of flow. When the stationary vane plates 38 and 45 are added to the assembly the flow curve of the meter attains the required accuracy at a much lower rate of flow and maintains the required accuracy throughout the total expected flow range.

By providing an unequal number of vanes on the rotor and the vane plates periodic turbulence in the chamber 14 is avoided, and so harmonic wave action that might produce excessive peak forces is avoided. For example in a preferred embodiment seven vanes are provided on the rotor and six on each vane plate.

The combination of the carefully designed inlet orifice 31, the stationary vane plates 38 and 45, the small radial bearings 78 and 82, and the selection of a material for use as a rotor with nearly the same specific gravity as the fluid being measured, all contribute to the efficient operation of the meter. The small radius of the bearings reduces the frictional resistance to acceleration and contribute to the accuracy at low flows, and the use of a suitable rotor material obviates the need for thrust bearings, and reduces wear on the radial bearings.

The structure of the invention also has special advantages attached to its ready assembly and disassembly arrangements, and it may be easily internally cleaned by removing bolts 21, lifting off the top housing member 12 and then rotating the bottom housing member 11 about 180° on its pipe connections to dump its contents.

In a successful reduction to practice of the meter of the invention, this meter was installed in a water line through which water was pumped at pressures between 3000 to 5000 pounds per square inch. The head loss across the meter at rotor speeds of about 1400 revolutions per minute and passing about 50 gallons per minute were not more than twenty pounds per square inch. Tests were run at flow ranges of five to fifty gallons per minute, and the meter registered accurately within plus or minus one half of one percent.

The invention may be embodied in other specific forms without departing from the spirit or essential characteristics therefore. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid flow meter, a housing formed internally with a rotor chamber having inlet and outlet openings, a fluid tight register assembly rigidly mounted on said housing with its register portion disposed outside said chamber and having a part projecting through said housing into said chamber, a rotor supported wholly by said part within said chamber for rotation about an axis substantially normal to the direction of flow of fluid through said chamber and adapted to be driven by fluid flow through said chamber, and coacting magnetic drive means on the rotor and within said part for transmitting said rotation of said rotor to actuate the register.

2. In the fluid flow meter defined in claim 1, said housing comprising a body recessed to define said chamber and a cover extending over said chamber releasably secured to said body, and said register assembly and the rotor on it being carried by said cover.

3. In the fluid flow meter defined in claim 2, said register assembly part comprising, a hollow tube mounting enclosing rotatable register drive shaft carrying a magnetic coupling element, and a post on said tube mounting means journalling said rotor for free rotation about the axis of said shaft.

4. In the fluid flow meter defined in claim 3, said rotor having a hollow hub surrounding said tube and mounting a magnetic drive coupling element in cooperative association with the magnetic coupling element on said shaft.

5. The fluid flow meter defined in claim 1 comprising stationary vane plates disposed at the top and bottom of said chamber.

6. The fluid flow meter defined in claim 5 wherein said housing is formed with an upper part mounting said register assembly and a lower part, one of said vane plates being secured to said upper part for removal therewith.

7. In a fluid flow meter, a housing enclosing a rotor chamber having inlet and outlet openings, a fluid-tight register assembly mounted on said housing with its register portion disposed outside said chamber and having a tube extending through an aperture in said housing into said chamber and terminating in a post in said chamber, means sealing said aperture around said tube, a rotor rotatably supported on said post in the path of fluid flow through said chamber, and cooperating magnetic coupling drive means for the register and mounted respectively on said rotor and within said tube, said rotor having a hollow hub portion surrounding said tube, said magnetic coupling means being magnetic members mounted on said hub portion and within said tube in concentric relation and at the same vertical level.

8. In the fluid flow meter defined in claim 7, said rotor having a main hub [journaled] *journalled* by bearings on said post and said hub portion being a boss projecting from said main hub.

*9. In a fluid flow meter, a casing enclosing a fluid measuring chamber having inlet and outlet openings, a rigid tubular well of non-magnetic material projecting into said chamber, means securing said well to said casing, with the axis of said well being disposed normal to the direction of fluid flow through said chamber, a fluid driven metering rotor journalled for rotation coaxially about the axis of said well in response to flow of fluid through said chamber, coacting drive and driven magnet means, said driven magnet means being mounted for rotation within said well and adapted to be operatively connected to a register means, and said drive magnet means being mounted for rotation with said rotor in surrounding relationship to said well for transmitting rotation of said rotor to said driven magnet means.*

*10. In a fluid flow meter, a casing enclosing a fluid measuring chamber having inlet and outlet openings, a rigid tubular well of non-magnetic material projecting into said chamber, means securing said well to said casing, with the axis of said well being disposed normal to the direction of fluid flow through said chamber, a fluid driven metering rotor journalled for rotation coaxially about the axis of said well in response to flow of fluid through said chamber, coating drive and driven magnet means, said driven magnet means being mounted for rotation within said well and adapted to be operatively connected to a register means, and said drive magnet means being mounted for rotation with said rotor in surrounding relationship to said well for transmitting rotation of said rotor to said driven magnet means, and bearing means carried by said well for radially and axially supporting said rotor, said rotor being supported wholly by said bearing means on said well.*

*11. In a fluid flow meter, a casing enclosing a fluid measuring chamber having inlet and outlet openings, a rigid tubular well of non-magnetic material projecting into said chamber, means securing said well to said casing, with the axis of said well being disposed normal to the direction of fluid flow through said chamber, a fluid driven metering rotor having a hollow hub portion, bearing means mounted within said hub portion, said rotor being wholly supported by said bearing means on said well for rotation coaxially about the axis of said well in response to flow of fluid through said chamber, and coacting drive and driven magnet means, said driven magnet means being mounted for rotation within said well and adapted to be operatively connected to a register means, and said drive magnet means being mounted in said hub portion for rotation with said rotor in surounding relationship to said well for transmitting rotation of said rotor to said driven magnet means.*

*12. In a fluid flow meter, a casing enclosing a fluid measuring chamber having inlet and outlet openings, a rigid tubular well of non-magnetic material projecting into said chamber, means securing said well to said casing, with the axis of said well being disposed normal to the direction of fluid flow through said chamber, a fluid driven metering rotor having a central bore therethrough, bearing surface means formed rigid with said well and surrounded by said bore, longitudinally spaced apart annular bearing members mounted within said bore in radial bearing engagement with said bearing surface means for rotatably mounting said rotor coaxially about the axis of said well in response to flow of fluid through said chamber, and coacting drive and driven magnet means, said driven magnet means being mounted for rotation within said well and adapted to be operatively connected to a register means, and said drive magnet means being mounted for rotation with said rotor in surrounding relationship to said well for transmitting rotation of said rotor to said driven magnet means.*

*13. The fluid flow meter defined in claim 12 comprising a register drive shaft coaxially mounted within said well and having one end projecting upwardly and out of the open end of said well, and an annular member received in and closing the upper end of said well, said shaft mounting said driven magnet means and projecting through said annular member for radial support.*

*14. The fluid flow meter defined in claim 12 wherein said drive and driven magnet means respectively comprise substantially coextensive annular, ceramic magnets.*

*15. The fluid flow meter defined in claim 12 wherein said rotor is supported wholly by said bearing members on said well.*

*16. The fluid meter defined in claim 12 wherein said rotor is formed with a hollow hub portion defining said bore, said drive magnetic means being mounted in said hub portion.*

*17. The fluid flow meter defined in claim 16 wherein said well forms a part of a sealed enclosure having a portion disposed exteriorly of said chamber, and wherein a register shaft adapted to be operatively connected to said register means is provided for mounting driven magnetic means, said shaft extending into said well and being journalled for rotation coaxially about the longitudinal axis of said well.*

*18. The fluid flow meter defined in claim 12 wherein said well terminates at its end projecting into said chamber in a post defining said bearing surface means.*

*19. In a fluid flow meter, a casing enclosing a fluid measuring chamber having fluid inlet and outlet openings, a relatively rigid tubular well mode of non-magnetic material and being secured to said casing, said well projecting into said chamber, a cylindrical post rigid with and extending from the end of said well into said chamber and being smaller in diameter than said well, the axis of said post being disposed normal to the direction of fluid flow through said chamber, a fluid driven metering rotor wholly supported on said post for rotation coaxially about the axis of said post, coacting drive and driven magnet means, said driven magnet means being mounted for rotation within said well and being adapted to be operatively connected to a register means, and said drive magnet means being mounted for rotation with said rotor in a path peripherally surrounding said well for transmitting rotation of said rotor to said driven magnet means.*

References Cited

The following references, cited by the Examiner, are of record in the patented file of this patent or the original patent.

| | | | |
|---|---|---|---|
| 855,190 | 5/1907 | Loetzer | 73—273 |
| 1,185,736 | 6/1916 | Trood | 73—230 |
| 1,580,647 | 4/1926 | Breck | 138—145 |
| 1,958,223 | 5/1934 | Yates | 73—229 |
| 1,963,330 | 6/1934 | Lumme | 73—229 |
| 2,529,481 | 11/1950 | Brewer | 73—231 |
| 2,713,261 | 7/1955 | Butterworth et al. | 73—231 X |
| 2,770,131 | 11/1956 | Sparling | 73—231 |
| 2,779,513 | 1/1957 | Dickey. | |
| 2,842,963 | 7/1958 | Ardley | 73—231 |
| 1,696,132 | 12/1928 | Wermeille | 310—104 |
| 2,857,763 | 10/1958 | Hague et al. | 73—257 |

(Other references on following page)

| | | | |
|---|---|---|---|
| 3,050,646 | 8/1962 | Eddy et al. | 310—104 |
| 3,169,398 | 2/1965 | Sparling et al. | 73—231 |
| 3,295,370 | 1/1967 | Marx | 73—231 |

FOREIGN PATENTS

| | | |
|---|---|---|
| 594,330 | 3/1934 | Germany. |
| 1,127,096 | 4/1962 | Germany. |
| 52,705 | 1/1937 | Denmark. |
| 181,070 | 2/1907 | Germany. |

| | | |
|---|---|---|
| 1,127,096 | 4/1962 | Germany. |
| 733,371 | 7/1955 | Great Britain. |

OTHER REFERENCES

German application Ser. No. S39,819, Freibel, December 1956.

RICHARD C. QUEISSER, Primary Examiner

E. D. GILHOOLY, Assistant Examiner

PO-1050
(5/69)

UNITED STATES PATENT OFFICE

CERTIFICATE OF CORRECTION

Reissue

Patent No. 26,654 Dated August 26, 1969

Inventor(s) W. F. Z. LEE Et Al

It is certified that error appears in the above-identified patent and that said Letters Patent are hereby corrected as shown below:

Column 1, line 21, change "wall" to --well--.

Column 2, line 51, change "pivoting" to --piloting--.

Column 7, line 38, change "coating" to --coacting--.

line 63, change "surounding" to --surrounding--.

Column 8, line 32 after "mounting" insert --said--.

line 41, change "mode" to --made--.

SIGNED AND
SEALED
JAN 27 1970

(SEAL)
Attest:

Edward M. Fletcher, Jr.
Attesting Officer

WILLIAM E. SCHUYLER, JR.
Commissioner of Patents